United States Patent Office 3,193,440
Patented July 6, 1965

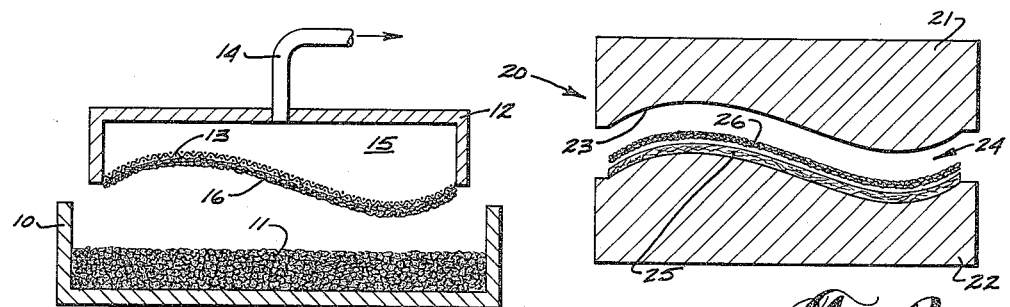
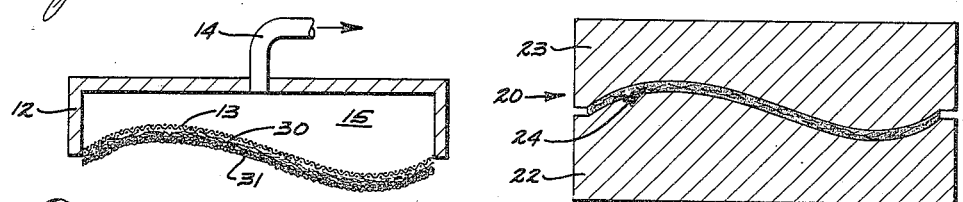
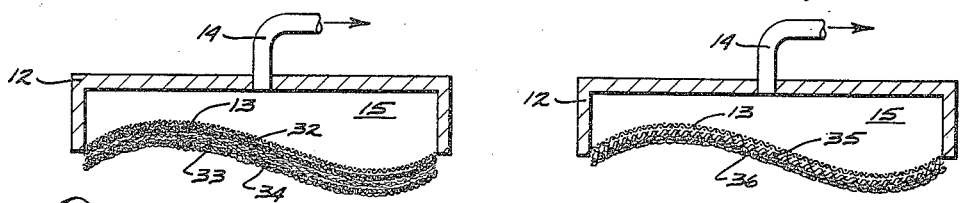
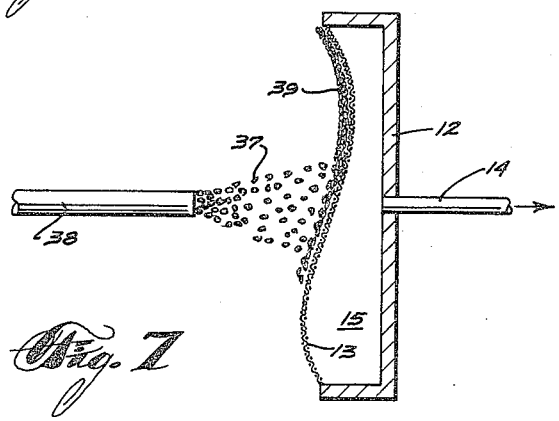
INVENTOR.
KENNETH A. SCHAFER
BY Harry B. Keck
ATTORNEY

3,193,440
LAMINATED ARTICLES AND LAMINATING PREFORMS THEREFOR
Kenneth A. Schafer, Cedarburg, Wis., assignor to Freeman Chemical Corporation, Port Washington, Wis., a corporation of Delaware
Filed Aug. 16, 1961, Ser. No. 131,836
10 Claims. (Cl. 161—159)

This invention relates to laminating preforms which are useful in the fabrication of laminated articles employing thermosetting resinous compositions.

More particularly, this invention concerns laminating preforms of foamed resin having open, connected cells which are especially useful in fabricating laminated articles having compound curvatures.

Thermosetting resinous compositions such as unsaturated polyester resins, epoxy resins, phenol-formaldehyde resins, urea-formaldehyde resins and the like have been widely used in the fabrication of laminated articles which employ fibrous reinforcing materials for structural strength, such as glass fibers, woven glass fiber fabrics and the like.

In copending application S.N. 125,272, filed July 19, 1961, there is described an improved laminated article containing foamed resinous materials which are saturated with thermosetting resinous compositions and are incorporated along with glass fiber mats into the laminated article. The foamed resinous materials serve as a barrier to prevent exposure of the glass fibers and also serve in combination with the thermosetting resinous compositions to provide an attractive surface presentation for the resulting laminated articles.

Sheets of foamed polyurethane having open, connected cells are flexible, elastic, highly compressible and are readily drapable over compound curvature molding assemblies. However, where the curvature is extreme, some lapping and folding of the sheet material may occur which might detract from the desirable surface presentation.

According to this invention, a laminating preform is provided which is fabricated from resilient fragments of open, connected celled flexible foamed polyurethane. The fragments are accumulated on a surface having the configuration of the molding cavity which will be utilized in the fabrication of the desired laminated article and, while maintained on that surface, the fragments are bonded together with a suitable binder to create a unitary structure which serves as a laminating preform.

The laminating preform of this invention is introduced directly into a molding cavity where it will correspond without stretching, folding or crinkling. Within the molding cavity, the laminating preform is impregnated with a suitable thermosetting resinous composition which will "wet" the preform. The preform thereafter is maintained under compression within the molding cavity while the thermosetting resinous composition is cured to a hardened thermoset condition in the void spaces of the foamed resin. The foamed resin, under compression, within a molding cavity will abut the mold surfaces and will cooperate with the thermosetting resinous composition to present an attractive grain appearance on the surface of the laminated article.

The present preform may be used alone in a laminated article or in combination with other laminating components such as glass fiber mats, woven glass fiber fabrics, relatively rigid structural elements such as metal sheets and components, plastic sheets and components, cements, wood, cardboard and the like.

The present laminating preforms may consist solely of the foamed polyurethane fragments and a binder or may comprise sandwich constructions which include at least one layer of the polyurethane fragments and at least one layer of fibrous reinforcing elements such as glass fibers.

FOAMED RESINS

The foamed resinous material, as heretofore mentioned, is preferably foamed polyurethane having open, connected cells. Other materials which have been investigated have been found to be undesirable for want of one or more of the following features:

The foamed resin must possess:

(1) Open-celled configuration;
(2) Flexibility;
(3) Elasticity;
(4) Ready compressibility; and
(5) Wettability with the liquid thermosetting resin.

Polyurethane foam is eminently satisfactory in the above-listed properties where the thermosetting resin is unsaturated polyester resin or epoxy resins.

The preferred foamed resin has cells of substantially uniform diameter in the range of 0.001 to 0.5 inch. The material is available in sheet form having varying thicknesses. Irregularly shaped fragments of foamed polyurethane are available as scraps from various processors of the material. The open, connected celled foamed polyurethane of heterogeneous sizes may be used in the present laminating preforms.

The cells of the foamed resin must be open and connected. Polyurethane foams having open, connected cell structures have been described in U.S. Patent 2,961,710 and Canada Patent 620,248. The cell-wall breakdown described in these references is accomplished through the action of organic solvents and inorganic reagents acting upon the customary closed-cell polyurethane foams.

THERMOSETTING RESINS

Unsaturated polyester resins are well-known in the art as a thermosetting resinous material. Such resinous compositions are widely utilized in the fabrication of furniture, automotive vehicle parts such as fenders and body moldings, boat hulls, machinery cases, machinery covers, helmets and the like. Frequently the unsaturated polyester resins are utilized in combination with fibrous reinforcing materials such as glass fiber mats, glass fiber fabrics, sisal fibers, hog-hair fibers, and the like. The unsaturated polyester resins usually are solutions of unsaturated polyesters in a polymerizable monomeric solvent such as styrene, vinyl toluene, acrylates, methacrylates and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of the unsaturated polyester are mixed to formuate a typical unsaturated polyester resinous composition. On heating, such compositions form three-dimensional (thermoset) polymeric bonds without substantial shrinkage in the presence of a suitable polymerization catalyst such as benzoyl peroxide. Customarily the thermosetting resinous compositions contain suitable pigmentation to present an opaque surface when cured. The precise formulation of unsaturated polyester resinous compositions forms no part of the present invention.

The principal object of this invention is to provide laminating preforms of foamed resinous substances.

A further object of this invention is to provide laminated articles employing thermosetting resinous compositions and laminated preforms of foamed resinous substances.

A still further object of this invention is to provide laminating preforms including foamed resinous substances and fibrous reinforcing materials.

These and other objects and advantages of this invention will become apparent from the following detailed description by reference to the accompanying drawings in which:

FIGURE 1 is a cross-section illustration of a container for foamed resinous fragments and a molding surface corresponding to the shape of a desired laminating preform;

FIGURE 2 is a cross-section illustration of a molding apparatus for fabricating laminated articles from the laminating preforms of this invention;

FIGURE 3 is a cross-section illustration of the molding apparatus of FIGURE 2 in closed position in which the actual fabrication of laminated articles occurs.

FIGURES 4, 5 and 6 are cross-section illustrations of the molding surface of FIGURE 1 showing alternative sequences for fabricating alternative embodiments of the present laminating preforms; and FIGURE 7 is a cross-section illustration showing the molding surface of FIGURE 1 and illustrating an alternative method for fabricating the present laminating preforms.

Referring to FIGURE 1 there is illustrated a container 10 having an inventory of fragments 11 of foamed resinous material such as foamed polyurethane. Ideally the foamed polyurethane fragments 11 are obtained as scraps from primary processors of foamed polyurethane. The fragments preferably are shredded into small crumbs from about 0.05 to 0.5 inch in diameter although small sheet-like pieces ranging to several inches in surface area may be employed provided that the sheets are not unduly thick according to the desired thickness of the present preforms.

The foamed resinous fragments 11 must have an open, connected cell structure. Foamed flexible polyurethane is excellent for this purpose. Foamed polyurethane is further preferred because of its ready compressibility and because it is readily wetted by thermosetting resinous compositions in liquid form.

A preform box 12 is provided having one foraminous wall 13 which corresponds in contour to the molding surface of a molding apparatus in which laminated articles are to be fabricated. The foraminous surface 13 may comprise a screen or a foamed resinous material, a micrometallic plate, a cloth or other material having pores or interstices which are smaller than the foamed resinous fragments 11. A pipe 14 communicates with the interior 15 of the preform box 12 and is connected to a low pressure source whereby a less than atmospheric pressure is maintained within the interior 15 of the preform box 12. As a result, air is drawn through the outer face of the foraminous surface 13 to the interior 15 of the preform box 12. By dipping the preform box 12 into the container 10, a covering 16 of the foamed resin fragments 11 is caused to adhere to the foraminous surface 13 so long as the pressure in the interior 15 of the preform box is maintained at a suitable value below atmospheric pressure. The covering 16 comprises a predetermined thickness of foamed resinous fragments conformed to the contours of the foraminous surface 13 and hence corresponds to the contours of the molding apparatus in which the present laminating preforms will be utilized for the fabrication of laminated articles. A suitable binder material is sprayed onto the covering 16 externally of the preform box 12. A rapid-drying adhesive substance is preferred for this binder function. The binder should be compatible with the thermosetting resinous composition which will be employed in the fabrication of the ultimate laminated article. After the binder substance has caused the foamed resinous fragments to cohere into a unitary laminating preform, the pipe 14 is disconnected from its low pressure source and the laminating preform is removed from the foraminous surface 13 for use as in fabrication of laminated articles.

The laminating preform is utilized in molding apparatus 20 similar to that shown in FIGURES 2 and 3. The molding apparatus 20 comprises an upper element 21 and a lower element 22. The surface 23 of the upper element 21 corresponds to the foraminous surface 13 of the preform box 12. Between the two elements 21, 22 there is a molding cavity 24 in which the components of the desired laminated article are positioned. These might include, for example, a preform glass-fiber mat 25 and the present laminating preform 26 of foamed resinous material. Glass-fiber laminating preforms are described in U.S. Patent 2,794,760. A supply of thermosetting resinous composition such as unsaturated polyester resin is introduced into the molding cavity 24 to impregnate the other components. Thereupon the molding elements 21, 22 are brought together as seen in FIGURE 3 to compress the foamed resinous laminating preform. The thermosetting resinous composition contains a suitable polymerization initiator and, upon heating, the thermosetting resinous composition is cured to a hardened, thermoset condition while dispersed throughout the void spaces of the compressed laminating preform 26 and the glass fiber mat 25. After the thermosetting resinous composition has cured, the molding elements 21, 22 are separated and the resultant laminated article is removed from the molding apparatus 20. It will be observed that the present laminating preform is maintained under compression during the curing of the thermosetting resinous composition. Accordingly, the readily compressible foamed resinous fragments are maintained in abutment with the molding surface 23 throughout the curing process and are substantially flattened from their initial uncompressed thickness. In the resultant laminated article, the foamed resin fragments will exhibit some of their cellular structure in the surface of the article. The void spaces in the cellular resin will be substantially entirely filled with the thermosetting resinous composition. Where the cells of the foamed resinous fragments are relatively large, the resulting surface presentation will be marbleized. Where the cells of the foamed resinous fragments are relatively small, the resulting surface will be fine-grained and will resemble fine-grained leather. The variations in surface presentation according to this invention are limitless. The amount of compression which is exerted upon the foamed resinous fragments within the molding apparatus 20 will affect the appearance of the resulting surface. Where the foamed resinous fragments are of one selected coloration (e.g., red, blue, green, et cetera) and the thermosetting resinous composition has a different coloration (e.g., white, gray, buff, et cetera), the resulting surface will have the basic appearance of the thermosetting resinous composition with fine lines of the coloration of the foamed resinous fragments throughout that surface. Mixtures of differently colored foamed resinous fragments will achieve an attractive heterogeneous surface presentation.

The laminating preform of FIGURE 1 consists solely of the foamed resinous fragments together with a suitable binder. These laminating preforms are useful alone in the fabrication of laminated articles with thermosetting resinous compositions or in combination with the glass-fiber mats as shown in FIGURE 2. An alternative embodiment of the present laminating preform is illustrated in FIGURES 4, 5 and 6.

As shown in FIGURE 4, a composite laminating preform can be fabricated by initially applying a first coating 30 of reinforcing fibrous materials such as glass fibers and thereafter applying a second coating 31 of the foamed resinous fragments. Subsequent application of a suitable binder spray will cause the two sequential coatings 30, 31 to cohere into a unitary laminating preform which can be applied directly into a suitable molding cavity such as the molding cavity 24.

A further alternative composite laminating preform is illustrated in FIGURE 5 where a first coating 32 of foamed resinous fragments is applied initially to the foraminous surface 13. Thereafter a second coating 33 of fibrous reinforcing materials such as glass fibers is applied over the first coating 32. Thereafter a third coating 34 of foamed resinous fragments is applied over the seconad coating 33. An application of a suitable binder spray causes the three coatings 32, 33, 34 to cohere into a unitary laminating preform which can be applied directly into a suitable molding cavity such as the molding cavity 24.

The laminating preform of FIGURE 5 will create a laminated article having a fine-grain appearance over both of its surfaces, whereas the laminating preform of FIGURE 4 will provide a laminated article having a fine-grain appearance over only one surface with the glass fiber mat being presented over the other surface. If desired, the laminating preform of FIGURE 4 could be combied with a laminating preform as shown in FIGURE 1 to produce a fine-grained surface over both surfaces of the resulting laminated article.

The laminating preform of FIGURE 6 is fabricated by applying an initial covering 35 of woven fabric over the foraminous surface 13 and thereafter applying a covering 36 of the foamed resinous fragments over the initial covering 35. A suitable binder might be applied to the fabric covering 35 or might be sprayed onto the covering 36 to create a unitary laminating preform suitable for direct insertion into a molding cavity 24.

An alternative method for positioning the foamed resinous fragments onto the foraminous surface 13 is illustrated in FIGURE 7 where a spray of foamed resinous fragments 37 is directed from a suitable nozzle 38 onto the foraminous surface 13 to form thereon a covering 39 of foamed resinous fragments coresponding to that shown in FIGURE 1. The use of the nozzle 38 permits more accurate control over the thickness and uniformity of the covering 39. In any of the fregoing embodiments, the reduced pressure level maintained within the interior 15 of the preform box 12 can be regulated to control the rate at which air is drawn through the foraminous surface 13 and hence to control the thickness of the present laminating preform.

A wide variety of binders is suitable in the present laminating preforms to create cohesion of the foamed resinous fragments. Unsaturated polyester emulsions are useful; water soluble starch binders are useful.

I claim:

1. A laminated article having a grained surface configuration comprising a formed unitary structure fabricated from resilient fragments of flexible foamed polyurethane having open, connected cells, the said unitary structure being impregnated with a thermosetting resinous composition which has been cured to an essentially foam-free hardened thermost condition while the said unitary structure was maintained under compression against a molding surface which is substantially coextensive with the said unitary structure and which is in compressive abutment with the said unitary structure whereby the said fragments are substantially flattened from ther initial uncompressed thickness.

2. The method of forming a composite laminating preform which comprises drawing air through a foraminous surface corresponding in contour to a molding cavity surface, contacting the outer face of said foraminous surface with fibrous reinforcing material whereby the said fibrous reinforcing material adheres to the said foraminous surface as a first covering therefor, thereafter contacting the said first covering with resilient, flexible, foamed resinous fragments having open, connected cells whereby the said fragments adhere to the said first covering as a second covering distinct from the first, applying a binder to the said first covering and the said second covering to bind the said fibers and the said fragments into a unitary structure having the contour of the said foraminous surface, terminating the passage of air through the said foraminous surface and recovering the said unitary structure as a laminating preform.

3. The method of forming a composite laminating preform which comprises drawing air through a foraminous surface corresponding in contour to a molding cavity surface, contacting the outer face of said foraminous surface with resilient, flexible, foamed resinous fragments having open, connected cells whereby a first covering of the said fragments adheres to the said foraminous surface, thereafter contacting the said first covering with fibrous reinforcing materials whereby the said fibrous reinforcing materials adhere to the said first covering as a distinct second covering, thereafter contacting the said second covering with resilient, flexible, foamed resinous fragments having open, connected cells whereby the said fragments adhere to the said second covering as a third covering, applying a binder to the said first, second and third coverings to bind the said fibrous reinforcing materials and the said fragments into a unitary structure having the contour of the said foraminous surface, terminating the passage of air through the said foraminous surface and recovering the said unitary structure as a laminating preform.

4. The method of claim 2 wherein the said fibrous reinforcing material comprises glass fibers.

5. The method of claim 3 wherein the said fibrous reinforcing material comprises glass fibers.

6. The method of claim 2 including the additional step of impregnating the said laminating preform with an essentially foam-free thermosetting resinous composition.

7. The method of claim 6 wherein the said thermosetting resinous composition is unsaturated polyester resin.

8. The method of claim 6 wherein the said thermosetting resinous composition is an epoxy resin.

9. The method of fabricating a laminated article which comprises positioning in a molding cavity a laminating preform comprising resilient fragments of flexible foamed polyurethane having open, connected cells, the said fragments being bound into a unitary structure by means of a binder and whereby the said unitary structure is preshaped and conforms to at least one molding surface of the said molding cavity, impregnating the said unitary structure with a non-foaming thermosetting resinous composition, compressing the said unitary structure within the said molding cavity so that the said fragments of the said unitary structure are substantially flattened from their initial uncompressed thickness, and curing the said thermosetting resinous composition to a hardened thermoset condition while maintaining the said unitary structure thus compressed, and recovering from the said molding cavity a laminated article having the said unitary structure confined in a compressed condition within the hardened essentially foam-free thermosetting resinous composition.

10. The method of claim 9 wherein the said thermosetting resinous composition is unsaturated polyester resin.

(References on following page)

References Cited by the Examiner

UNITED STATES PATENTS

| | | | |
|---|---|---|---|
| Re. 20,029 | 7/36 | Fischer | 156—62.8 X |
| 1,986,404 | 1/35 | Madge et al. | 117—27 |
| 2,158,033 | 5/39 | McKinney. | |
| 2,185,586 | 1/40 | Brooks | 156—242 X |
| 2,863,797 | 12/58 | Meyer. | |
| 2,927,876 | 3/60 | Hoppe et al. | 161—159 X |
| 2,929,436 | 3/60 | Hampshire | 156—38 |
| 3,025,202 | 3/62 | Morgan et al. | 156—38 XR |
| 3,038,826 | 6/62 | Medl | 161—184 X |

FOREIGN PATENTS

| | | |
|---|---|---|
| 1,014,879 | 6/52 | France. |
| 1,210,553 | 9/59 | France. |

EARL M. BERGERT, *Primary Examiner.*